United States Patent [19]

Tashiro

[11] Patent Number: 5,190,770
[45] Date of Patent: * Mar. 2, 1993

[54] APPARATUS FOR CUTTING AND SHAPING A SPHERICAL BODY

[75] Inventor: Yasunori Tashiro, Utsunomiya, Japan

[73] Assignee: Rheon Automatic Machinery Co., Ltd., Utsunomiya, Japan

[*] Notice: The portion of the term of this patent subsequent to Mar. 24, 2009 has been disclaimed.

[21] Appl. No.: 732,722

[22] Filed: Jul. 18, 1991

Related U.S. Application Data

[63] Continuation of Ser. No. 546,498, Jun. 29, 1990, abandoned.

[30] Foreign Application Priority Data

Jan. 12, 1989 [JP] Japan .................. 1-313654

[51] Int. Cl.⁵ ............................................. B29C 47/06
[52] U.S. Cl. .................... 425/132; 264/167; 425/142; 425/308
[58] Field of Search ............ 425/382 N, 287; 264/167; 426/512, 516; 72/254, 255, 468

[56] References Cited

U.S. PATENT DOCUMENTS

| | | | |
|---|---|---|---|
| 1,922,770 | 8/1933 | Kornbath | 72/468 |
| 2,044,961 | 6/1936 | Waner | 264/167 |
| 2,260,479 | 10/1941 | Picking | 72/468 |
| 2,578,229 | 12/1951 | Clement et al. | 72/468 |
| 2,664,996 | 1/1954 | Andrews | 72/468 |
| 3,509,785 | 5/1970 | Fuchs, Jr. | 72/468 |
| 3,628,449 | 12/1971 | Phillips, Jr. | 72/468 |
| 3,901,641 | 8/1975 | Onder | 425/406 |
| 4,036,571 | 7/1977 | Geyer et al. | 425/562 |
| 4,251,201 | 2/1981 | Krysiak | 425/311 |
| 4,734,024 | 3/1988 | Tashiro | 425/132 |
| 4,767,304 | 8/1988 | Tashiro | 425/308 |
| 4,767,305 | 8/1988 | Tashiro | 425/308 |

FOREIGN PATENT DOCUMENTS

| | | |
|---|---|---|
| 272176 | 3/1914 | Fed. Rep. of Germany . |
| 62-42714 | 11/1987 | Japan . |
| 6501749 | 8/1966 | Netherlands . |
| 76102779 | 7/1989 | Taiwan . |

Primary Examiner—David A. Simmons
Assistant Examiner—William J. Matney, Jr.
Attorney, Agent, or Firm—Guy W. Shoup; David W. Heid; Patrick T. Bever

[57] ABSTRACT

An improved apparatus for cutting and shaping a spherical body of a sticky material, composed of an assembly consisting of a number of rotary polygonal members for collectively forming an enclosure at the center thereof to cut and shape the material passing through the enclosure, each of the members with curved side surfaces being associated such that the enclosure is confined through the exposed part of the curved side surfaces of the polygonal members which pivotally swing to open and close the enclosure, and that the tip of each of the polygonal members tracks the exposed curved side surface of the adjacent polygonal member to scrape off the material adhering thereto, and each of the polygonal members having a uniform thickness that is thick enough to preclude the member from wedging into the material and that decreases toward the tip thereof, so that substantially spherical products can be continuously produced without generating any difficulty caused by the material adhering to the cutting members or by the filling protruding through the coating even when processing very sticky, soft materials.

1 Claim, 7 Drawing Sheets

APPARATUS FOR CUTTING AND SHAPING A SPHERICAL BODY

This application is a continuation of application Ser. No. 07/546,498, filed Jun. 29, 1990, now abandoned.

TECHNICAL FIELD

This invention is in general concerned with an apparatus for cutting and shaping a spherical body. It is particularly useful for processing a substantially round food product consisting of soft, very sticky material without generating the problems of dough adhesion or clogging as well as of protrusions from a filling.

BACKGROUND OF THE INVENTION

U.S. Pat. No. 4,883,678 discloses an apparatus for shaping a round body consisting of a dough coating and a filling, which comprises an assembly comprising a plurality of circumferentially disposed members combined to shape a spheroidal body. Each of the members has at least two sliding surfaces, and they are so combined that a sliding surface of one member is slidable on a sliding surface of another member, that the opening is closed and opened by sliding the members, and that the opening is confined by walls consisting of the inwardly exposed part of the sliding surfaces of the members and is of a cross-sectional area, when the opening is fully open, sufficient to pass a cylindrical body passing therethrough.

While shaping a spheroidal body through the assembly of slidable members is effective, particularly in precluding a member from intruding into the body, it has certain disadvantages. Because of the structural conditions of the assembly, the number of slidable members is limited to up to about six, so that only polygonally-shaped products have been obtained. The external appearance of these polygonal products falls far below that of those hand-shaped spherical ones. Further, owing to mechanical and dimensional imperfections in the shape of the slidable members, especially when processing a very sticky, soft material, there was also some difficulty in completely preventing materials from adhering to the cutting part, or in uniformly and neatly shaping a spherical product.

Accordingly, it is an object of the subject invention to provide a new and improved apparatus for cutting and shaping a spherical body.

It is another object of the subject invention to provide an improved apparatus for cutting and shaping a spherical body using a new shutter or iris mechanism comprising a number of rotatable polygonal members.

It is a further object of the subject invention to provide an improved apparatus for cutting and shaping a spherical body which completely precludes coatings or fillings from adhering to the cutting members through new specially configured polygonal members.

SUMMARY OF THE INVENTION

In accordance with those and other objects, this invention provides for a new and improved apparatus for cutting and shaping a spherical material, comprising an assembly consisting of a plurality of identically-shaped polygonal members, pivotally fitted to supporting axes or fulcrums that are equidistantly disposed on a circle to collectively and radially form an opening at the center thereof, each of the members having first and second curved side surfaces and a tip positioned opposite the supporting axis. They are associated with each other such that the tip of one member tracks the first curved side surface of an adjacent member, that the opening is closed and opened by the pivotal movements thereof, with the tip and the first and the second curved surfaces of adjacent members abutting each other at the closed position, and that the opening is confined by the exposed part of the first curved surfaces of the members to cut and shape the material passing through the opening.

In a preferred embodiment, the first and second curved side surfaces are each an arc of a circle with a radius equal to the distance between any pair of adjacent supporting fulcrums, and, when the tip is at the center of the opening, the center of the arc of the first curved side surface is at the same time located at a distance from the fulcrum of one member that is equal to the radius of the circle and at a distance from the center of the opening that is equal to the distance between the fulcrums, and the center of the arc of the second curved side surface is at the same time located at a distance from the fulcrum of the next member that is equal to the radius of the circle and at a distance from the center of the opening that is equal to the distance between the fulcrums.

In another preferred embodiment of the invention, the first curved side surface of each of the polygonal members has a uniform thickness that is thick enough to preclude the member from wedging into the material except for the area near the tip thereof, where the thickness decreases toward the tip.

Further objects and advantages of the invention will become apparent from the following detailed description, taken in conjunction with the drawings.

DETAILED DESCRIPTION OF THE INVENTION

Figure 1:
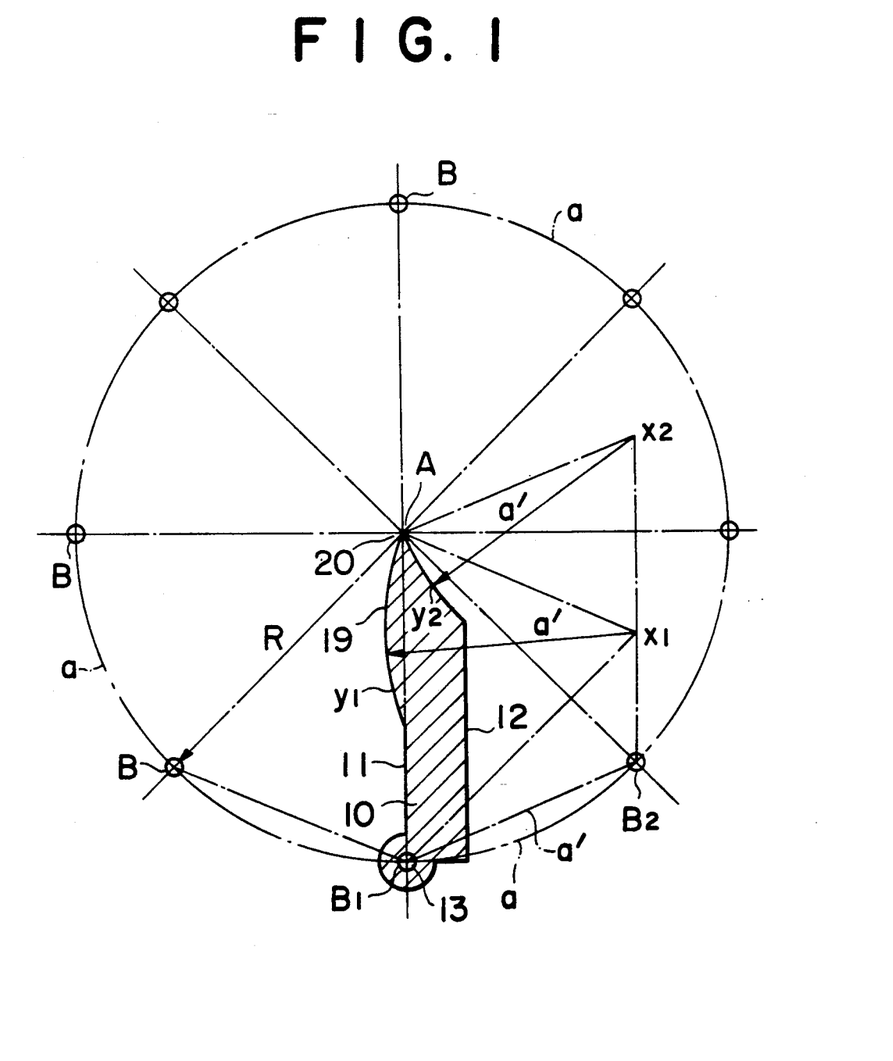
FIG. 1 is a simplified view of a polygonal member for forming an enclosure to cut a material passing therethrough.

Referring to FIG. 1, the feature of polygonal members 10 constituting the shutter mechanism of this invention is shown. Fulcrums B are equidistantly disposed on a circle "a" with a radius R around the center A. At each fulcrum is positioned an axis 13 to which the polygonal member is pivotally fitted.

The distance between the two adjacent fulcrums $B_1$ and $B_2$ is represented by a'.

A curve $y_1$ is an arc of a circle whose radius is equal to the distance $a'$ and whose center $x_1$ is at the same time located at a distance from the fulcrum $B_1$ that is equal to the radius R and at a distance from the center A that is equal to the distance $a'$.

A side surface defined by the curve $y_1$ constitutes the blade part 19 of the polygonal member with a tip 20. The blade contacts and cuts a material.

A curve $y_2$ is an arc of a circle whose radius is equal to the distance $a'$ and whose center $x_2$ is at the same time located at a distance from the fulcrum $B_2$ that is equal to the radius R and at a distance from the center A that is equal to the distance $a'$.

A side surface defined by the curve $y_2$ is positioned in the rear of the curve $y_1$, and limits the width of the blade 19 at the tip thereof.

Figure 2:
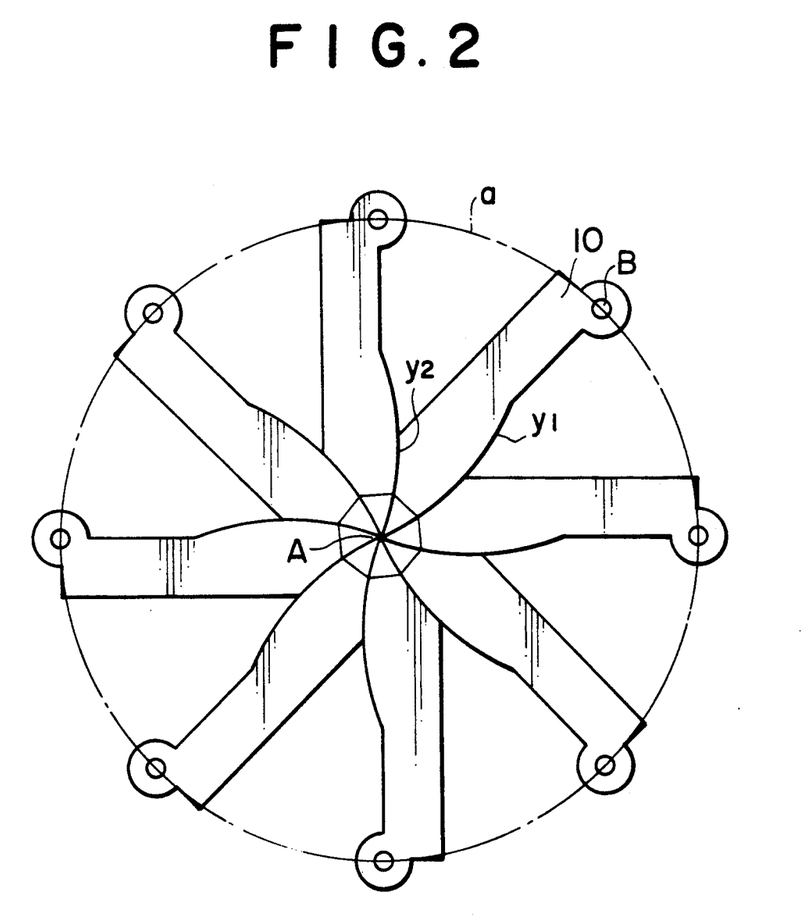
FIG. 2 is a schematic plan view of the collectively assembled polygonal members when the enclosure is closed.
Figure 3:
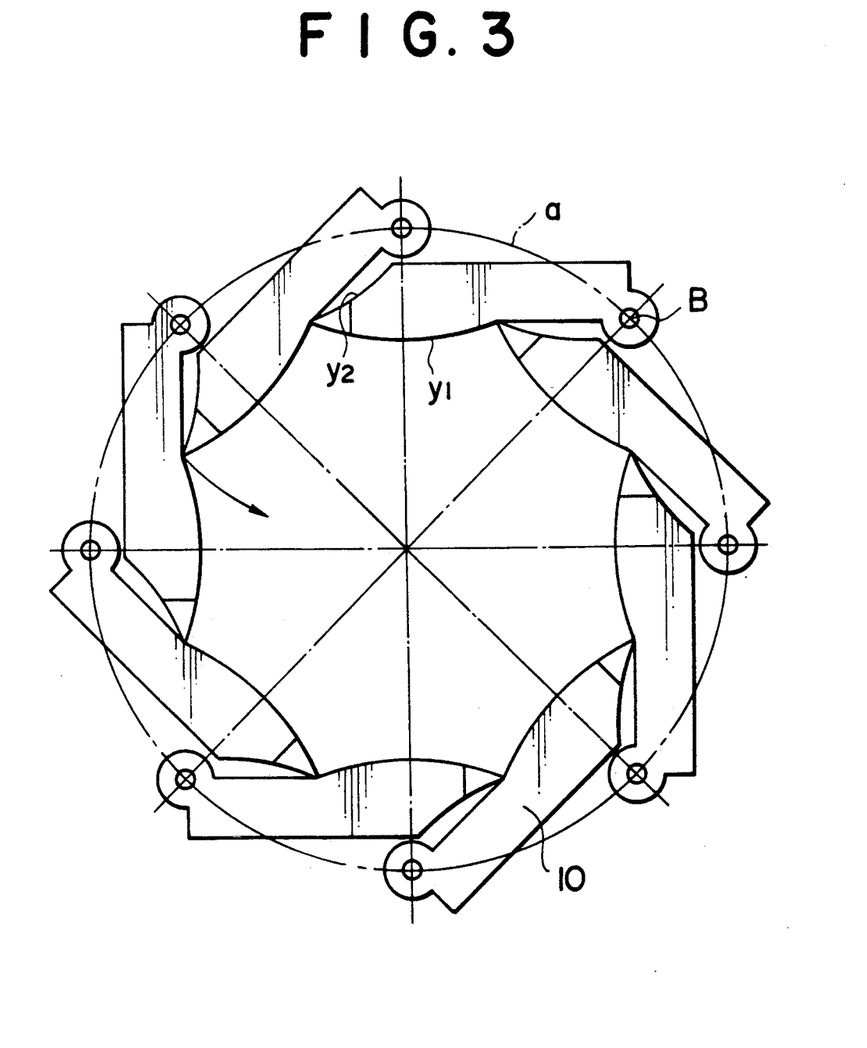
FIG. 3 is a schematic plan view of the assembled polygonal members when the enclosure is opened.

Side surfaces 11 and 12 constituting the neck of the polygonal member are formed such that there is no interference among any adjacent polygonal members during the course of the rotation shown in FIGS. 2 and 3. The axis 13 to be fitted to the fulcrum $B_1$ is located at the end of the neck.

Figure 4:
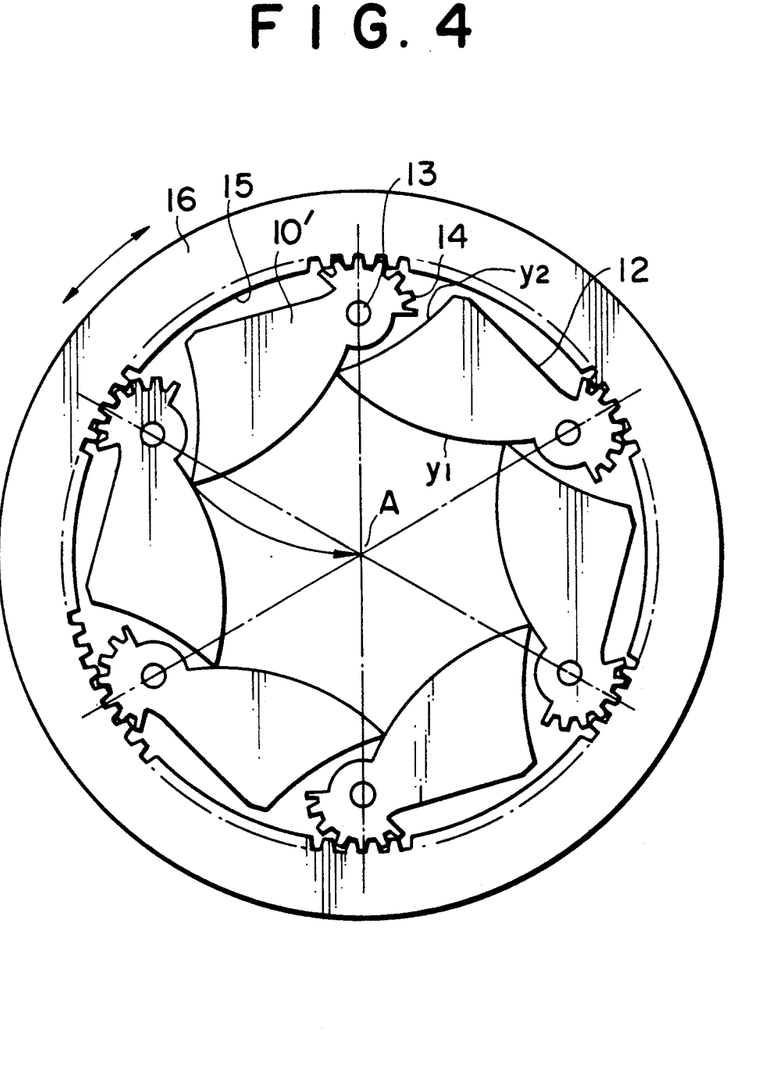
FIG. 4 is a schematic plan view of the assembled polygonal members of another embodiment, and illustrates a method of driving them.

In FIG. 4, showing another embodiment of this invention, each of polygonal members 10', is coincidentally and orderly rotated through a gear or pin mechanism without any mutual interference therebetween. A pinion 14 pivoted to the axis 13 rotates the polygonal members 10'.

An internal gear 15, engaged with the pinion 14, is mounted on a frame 16. The polygonal members 10' are coincidentally rotated to open and close a central enclosure formed around the center A via the pinion 14 driven by the rotation of the frame 16.

Owing to the structure of such rotary polygonal members free from mutual interference, restriction on the number of them that can be mounted on a frame is reduced so that, by mounting a number of polygonal members up to 24 or more on the frame, forming a product that is almost a sphere has been achieved.

The cutting functions and effects of the apparatus of this invention will now be described by referring to FIGS. 5-11.

Figure 5:
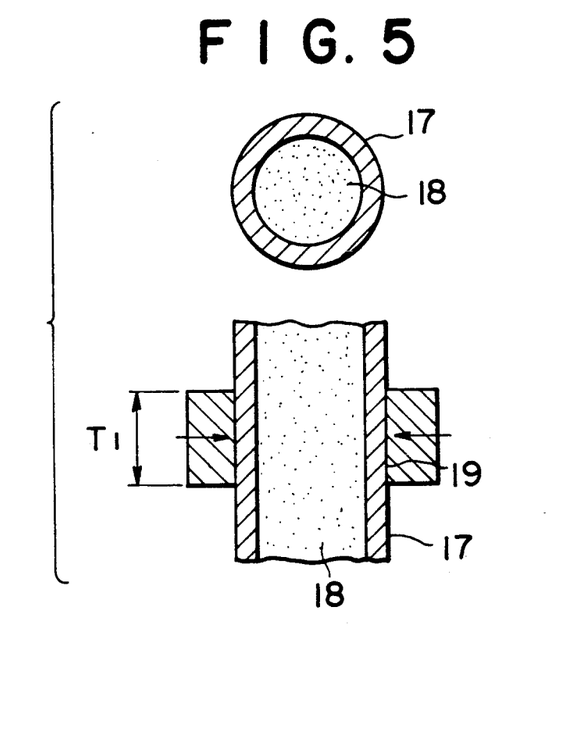
FIGS. 5–8 are schematic cross sections of the material and polygonal members showing stepwise the process of cutting a spherical body.

In the upper part of FIG. 5 is shown a cross section of a continuous bar of a material consisting of a coating 17 consisting of dough with a filling 18 therein. In its lower part, the continuous bar is held in the opening formed by the polygonal members. The continuous bar is in contact with the blades 19 of the curved surface $y_1$ having a uniform thickness $T_1$.

The blade 19 of each polygonal member has a uniform thickness that is thick enough to prevent the member from wedging into the coating except for its tip area, where the thickness decreases toward the tip 20.

Figure 6:
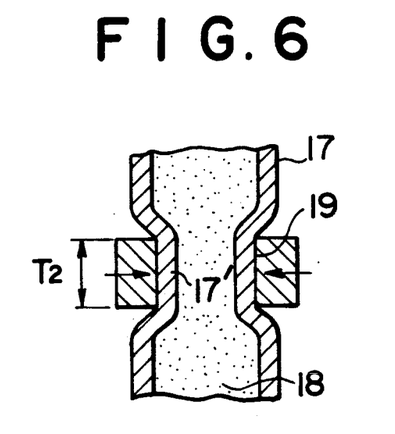

As the polygonal members swing toward the center of the frame, the blades come closer to the center to narrow the opening and thus restrict the continuous bar. Due to the structure of the blades, the thickness of the blades where they contact the continuous bar is reduced from $T_1$ to $T_4$. In FIG. 6, an intermediate thickness of the blades is $T_2$ when the continuous bar is constricted in a state as shown by the position of its coating 17'.

Figure 7:
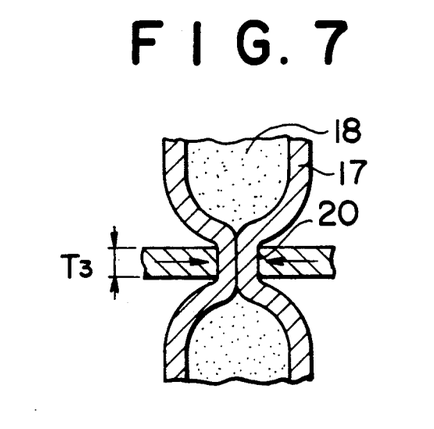

FIG. 7 shows a state wherein the continuous bar is further constricted so that the coating forms a neck therein. In this state, the thickness $T_3$ is much smaller than $T_2$ and is close to that of $T_4$, the thickness of the tip. The improved shutter mechanism, which is based on the principle of rheology, enables the apparatus to press the filling 18 aside into the upper and lower parts of the bar while the coating part in the neck maintains its continuity both in the upper and lower parts of the bar at the time of separation. This is because according to the principle the rectangular force applied to the bar through the blades rheologically generates two different stresses: one is a shearing stress to cut the coating 20, and the other is a normal stress to press the filling 18 aside into the upper and lower directions.

Figure 8:
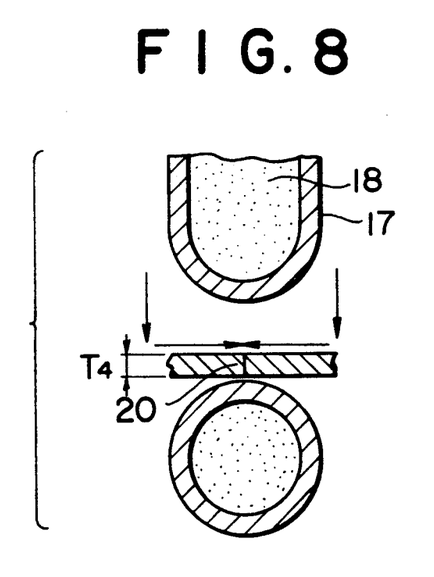

As shown in FIG. 8, when the polygonal members close the opening, with the tip of $T_4$ being abutted, a spherical product is completed. Usually a tray (not shown) is provided underneath the apparatus and receives the spherical product.

Figure 11:
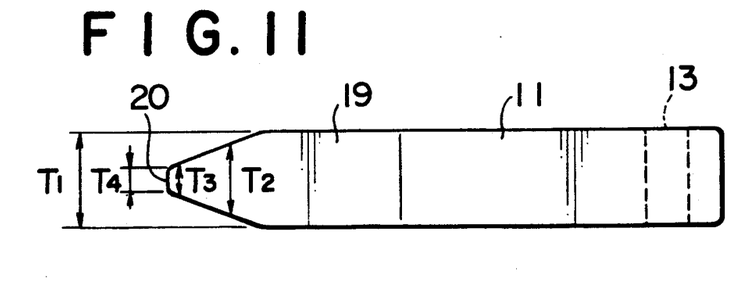
FIG. 11 is a cross section of a polygonal member 10, and shows its thickness, which gradually decreases towards its tip.

In short, while the thickness of the surfaces $T_1$ of the blade 19 gradually decreases from $T_1$ to $T_2$, $T_3$, and $T_4$, they urge the sides of the coating toward the cutting position so that the coating is finally and perfectly cut by each of the blades 19 at the tip 20. In the above-mentioned cutting process, the continuous bar consists of the coating 17 and the filling 18. However, the bar can be single-layered.

Figure 9:
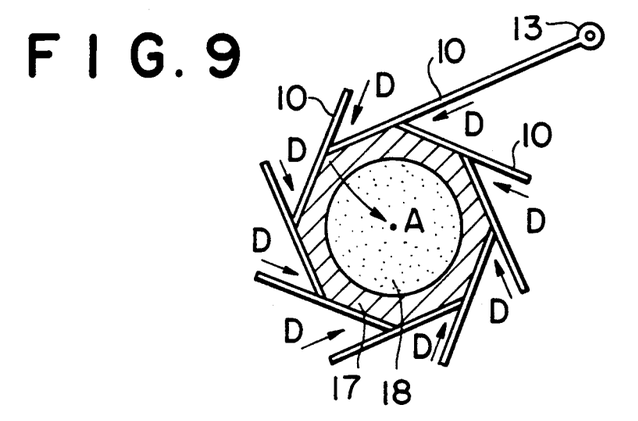
FIGS. 9 and 10 are each a schematic partial plan view of the polygonal members, and illustrate the effect of the invention in eliminating sticky materials from the cutting members.
Figure 10:
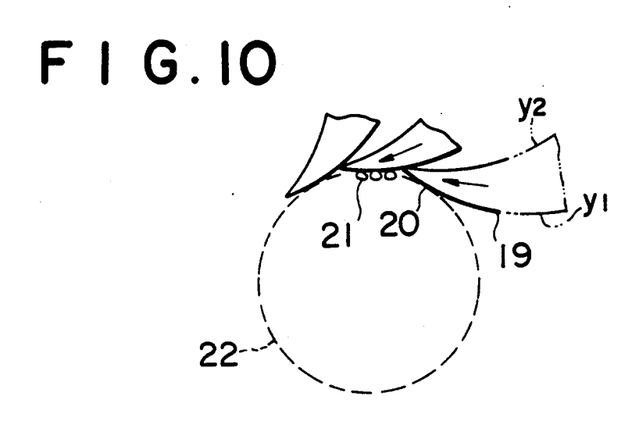

Referring to FIGS. 9 and 10, when the enclosure is closing, every polygonal member 10 is, as already detailed, driven via the axis 13, so that a forward swing results, and the tip 20 of each polygonal member 10 tracks the curve $y_1$, formed along a dotted circle 22 around the center A, in a scraping way in the direction indicated by arrows D.

Since, as a result of the above-mentioned tracking movement, materials 21 that have adhered to the blade surfaces are scraped off, the assembly of the invention enables the cutting and shaping process to be continued without generating any difficulty caused by such adhering materials, even when processing very sticky, soft materials. The invention provides a new and improved apparatus for cutting and shaping very sticky cake-like materials to obtain substantially spherical products free from any impediments caused by adhesion, and without the use of any special parting agents or powdering.

I claim:

1. An apparatus for cutting and shaping a spherical material from a continuous bar of material consisting of dough with a filling therein, comprising an assembly consisting of a plurality of identically-shaped cutting and shaping members, one end of each of the members being pivotally fitted to each of a plurality of fulcrums that are equidistantly disposed on an imaginary circumference formed by connecting the fulcrums, and the opposite end of each of the members being formed into a tip so that the members collectively and radially form and close an opening concentric to the circumference surrounded by the members when each member pivots away from and towards the center of the circumference, respectively, thereby to cut and shape material passing through the opening, wherein each of the cutting and shaping members has on both sides thereof adjacent the tip first and second curved side surfaces and respectively, such that when the members make a pivotal movement, the tip of one member slides over the first curved side surface of an adjacent member so that the opening is confined by an exposed part of the first curved side surface of the members to cut and shape the material, wherein each of the first and second curved side surfaces forms an arc whose radius is equal to the distance between the fulcrums of two adjacent cutting and shaping members, and when the opening is closed, the center of the arc of the first curved side surface of a cutting and shaping member is at the same time located at a distance from the fulcrum of a member that is equal to the radius of the imaginary circumference and at a distance from the center of the opening that is equal to the distance between two adjacent fulcrums, and the center of the arc of the second curved side surface is at the same time located at a distance from the fulcrum of the next member, in the direction going from the first curved side surface to the second curved side surface, that is equal to the radius of the imaginary circumference and at a distance from the center of the opening that is equal to the distance between two adjacent fulcrums, and wherein the first curved side surface of each of the cutting and shaping members has a uniform thickness, except for an area near the tip thereof, where the thickness decreases toward the tip.

* * * * *